Feb. 25, 1936. M. GODER Re. 19,867

FOLDING OF ENVELOPE BLANKS AND THE LIKE

Original Filed Aug. 22, 1933 3 Sheets-Sheet 1

INVENTOR:
Max Goder
By Geo. H. Kennedy Jr.
Attorney

Feb. 25, 1936. M. GODER Re. 19,867

FOLDING OF ENVELOPE BLANKS AND THE LIKE

Original Filed Aug. 22, 1933 3 Sheets-Sheet 2

Inventor:
Max Goder
By Geo. W. Kennedy Jr.
Attorney

Feb. 25, 1936. M. GODER Re. 19,867

FOLDING OF ENVELOPE BLANKS AND THE LIKE

Original Filed Aug. 22, 1933 3 Sheets-Sheet 3

Inventor:
Max Goder
By Geo. H. Kennedy Jr.
Attorney

Reissued Feb. 25, 1936 Re. 19,867

UNITED STATES PATENT OFFICE 19,867

FOLDING OF ENVELOPE BLANKS AND THE LIKE

Max Goder, Neuss, Germany, assignor to United States Envelope Company, Springfield, Mass., a corporation of Maine Original No. 1,985,859, dated December 25, 1934, Serial No. 686,273, August 22, 1933. Application for reissue May 10, 1935, Serial No. 20,835

8 Claims. (Cl. 93—67)

The present invention relates to the folding of envelope blanks and like articles requiring a plurality of folding operations performed in sequence and along fold lines substantially at right angles to each other, for the conversion of such blanks into envelopes, bags, or the like.

An object of the invention is the utilization of suction devices for forming certain of said folds in a highly efficient, certain and accurate manner. Other and further objects and advantages of the invention will be apparent from the following detailed description thereof, taken in connection with the accompanying illustrative drawings, wherein—

Fig. 3 is a large scale sectional view on the line 3—3 of Fig. 2, looking in the direction of the arrows.

Like reference characters refer to like parts in the different figures.

Figures 1, 5, 6, 7, 8:
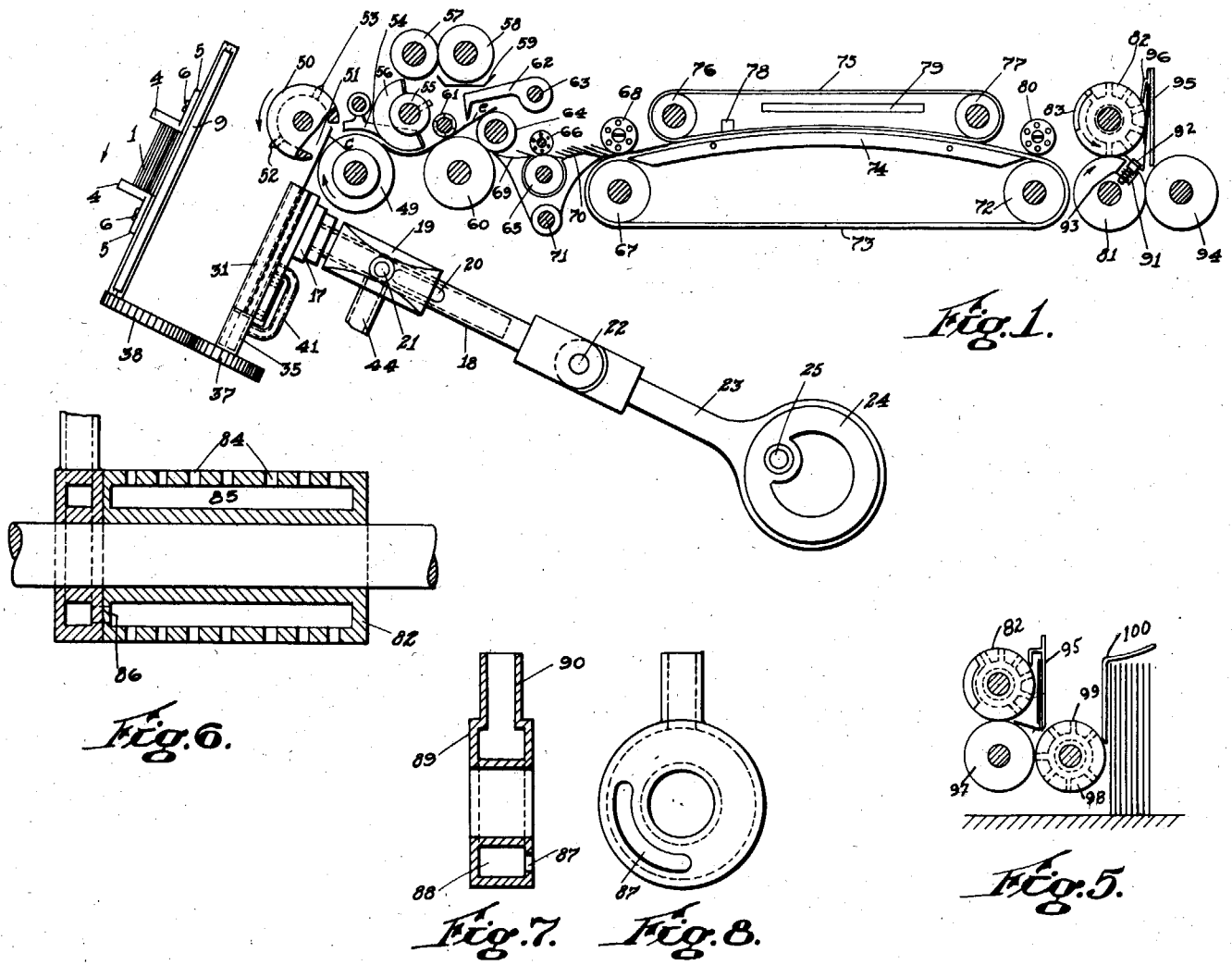
Fig. 1 is a sectional, partly diagrammatic view illustrating in vertical section the essential elements of a machine for folding envelope blanks, constructed in accordance with my invention.
Fig. 5 illustrates a modified arrangement of the fold-completing instrumentalities appearing at the right hand end of Fig. 1.
Fig. 6 is a large scale sectional view of one of the suction rollers and its associated parts shown at the right hand end of Fig. 1.
Figs. 7 and 8 are views in section and in end elevation, respectively, of a hollow member associated with the roller of Fig. 6.
Figure 2:
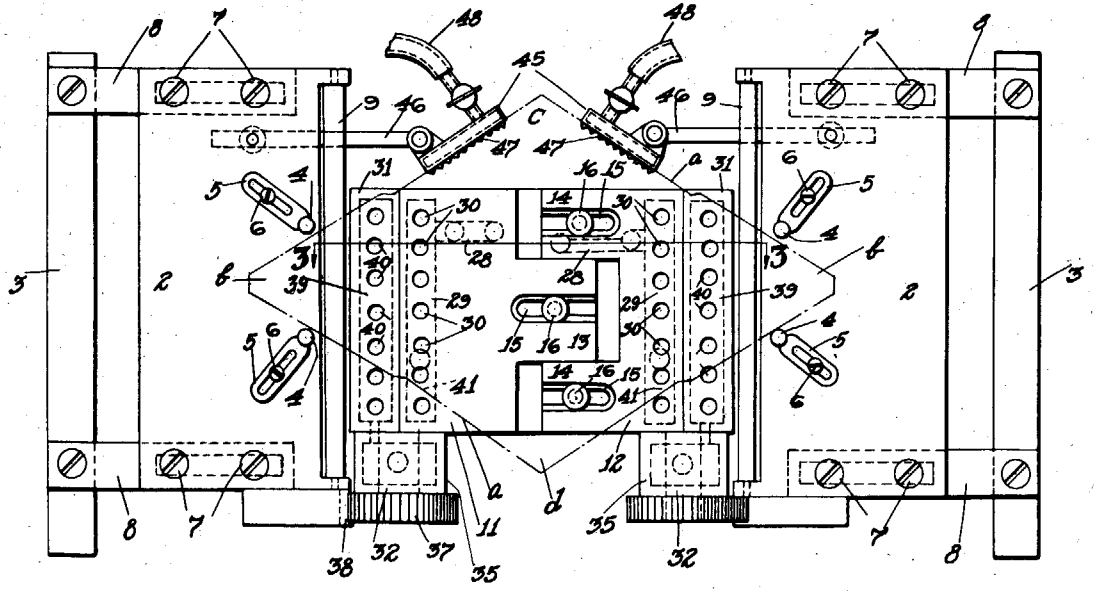
Fig. 2 is a large scale view of the blank-supporting and suction-folding parts of the machine as they appear when viewed from the left hand end of Fig. 1.

The drawings show my invention in connection with apparatus arranged for the folding of blanks for open-side envelopes,—the general shape of such a blank being that indicated in Fig. 2 by the broken lines *a*, *a*, viz., a blank providing a rectangular central or body portion, with a triangular flap or extension along each of the four sides thereof. A stack of such flat blanks, in the machine herein illustrated, occupies the position shown at 1 in Fig. 1, the support for the stack in this position being a pair of spaced parallel plates 2, 2, somewhat inclined from the vertical, which are adjustably secured to suitable members 3, 3 of the machine frame; the opposed inner portions of such plates 2, 2 underlie the extremities of the triangular lateral flap portions *b*, *b* of the stack of blanks 1, and the edgewise support of such inclined stack in the position shown, is afforded by two sets or pairs of pins or posts 4, 4, carried by and projecting outwardly and upwardly from the plates 2, 2. The posts or pins 4, 4 engage and thereby maintain the registry of the edges of the lateral flaps *b*, *b*, said posts, for purposes of adjustment to different sizes and shapes of blanks, being carried by slotted members 5 which are fastened to the plates 2, 2 by means of screws 6 extending through the slots thereof; this form of mounting permits any desired adjustment of the posts 4, 4 relative to the plates 2, 2, and the latter themselves, by means of screws 7 passing through elongated slots of the frame supports 8, 8, can be adjusted toward and away from each other as desired, depending upon the size and shape of the blanks to be operated upon in the machine. Preferably, at the inner opposed edges of said plates 2, 2 are disposed the transverse rollers 9, 9, underlying the lateral flaps *b*, *b* of the lowermost blank of the stack and facilitating the withdrawal of said blank when the latter, as hereinafter described, is pulled away by seizure of portions thereof lying between the stack supporting plates 2, 2.

According to my invention, this seizure and withdrawal of each successive lowermost blank from the stack 1 accomplishes in a novel and efficient manner the folding inwardly of the two lateral flaps *b*, *b* of the blank, which folding is, of course, an essential step in the formation of the back wall of the envelope made from a blank of the illustrated shape. The instrumentalities for such blank seizure, withdrawal, and folding comprise, as here shown, a reciprocatory structure which periodically enters the space between the stack supporting plates 2, 2 to engage and seize the hitherto unsupported central portion of the lowermost blank; said blank is stripped from the stack on the withdrawal motion of such structure, the latter thereby becoming a support underlying the blank's central portion and serving as a plate or platen on which to fold down the overhanging lateral flap extensions *b, b*.

Said reciprocatory structure comprises, as best shown in Fig. 3, a base member 10, the face of which carries and is substantially covered by a pair of plates 11 and 12, the latter, as shown in Fig. 2, preferably providing interfitting extensions 13 and 14, 14, respectively, in which are elongated slots 15, 15 for the passage of suitable retaining screws 16, 16 that enter the base 10. These slots and screws provide the means by which the plates 11 and 12 can be adjusted toward and from each other, and fixed in any desired position to vary the effective width of the blank engaging face of said reciprocatory structure, it being understood that such face in every position of said structure occupies a plane substantially parallel to that occupied by the spaced stack-supporting plates 2, 2. The base 10 is suitably secured to a recessed member 17 carried by the end of a hollow rod 18, which is reciprocated back and forth in a suitably mounted guide or support 19,—there being an elongated slot 20 (Fig. 1) in said rod by which to connect the interior of same, during the back and forth movements of the rod in the guide or support 19, either with the atmosphere or with a suction port or passage 21 provided by said support or guide in the path of travel of said slot,—depending upon the position of said hollow rod 18. The latter obtains its back and forth movement in the guide 19 by its pivotal connection, at 22, to a rod 23 carried by an eccentric 24 on the rotating machine shaft 25, (Fig. 1),—it being understood that the reciprocating structure at one limit or extreme of its movement occupies substantially the position shown in Fig. 1, and at the other limit or extreme of its movement occupies the position substantially as shown in Fig. 3, i. e., where the plates 11 and 12 have entered the space between the stack-supporting plates 2, 2 for engagement with the lowermost blank of the stack.

The interior of hollow rod 18 is in constant communication with a chamber 26 of member 17, and said chamber, through suitable openings 27, 27 in base 10, is in constant communication with recesses or conduits 28, 28 in those faces of the plates 11 and 12 which oppose said base 10. The recesses 28, 28 open into elongated interior passages 29, 29 of the plates 11 and 12, and from each of said passages there opens on the exterior faces of said plates a row of suction-openings 30, 30, immediately adjacent that edge of the plate 11 or 12 which, as hereinafter described, corresponds substantially to the proposed line of fold of a lateral flap portion *b* of each blank. The arrangement is such that in any position of adjustment of the plates 11 and 12, their suction-openings 30, 30 are always in communication with the interior of the rod 18,—a considerable latitude of adjustment being afforded by the length of the recesses or conduits 28, 28 in the direction of such adjustment.

The reciprocatory blank-engaging structure also includes a pair of wings or extensions 31, 31, arranged alongside of and substantially coextensive with the aforesaid ends or edges of the plates 11 and 12 which provide the suction-openings 30, 30. Each such wing or extension is preferably of a cross section corresponding substantially to a quarter of a circle (Fig. 3), and each such elongated body of quarter-circle cross section has projecting therefrom at one end thereof a concentric full cylindrical extension or shaft 32, the latter having its axis substantially alined with the intersection of the two plane radial surfaces 33 and 34 of the associated wing or extension. Each such shaft 32 constitutes for its wing or extension 31, a means of support and also a means for imparting rotation,—each shaft 32 being for this purpose journalled in a suitable bearing 35 which is provided in each instance by a bracket 36 secured near one corner of the plate 11 or plate 12, as the case may be. Each shaft 32 extends through and beyond the bearing 35 and carries on its outer end a gear or pinion 37, the latter being in mesh, in each instance, with a rack 38 suitably secured to and extending at right angles from the associated stack-supporting plate 2. The gearing 37, 38 is such as to produce substantially a half revolution of each shaft 32 on each stroke of the reciprocatory structure; that is to say, when the reciprocatory structure occupies the position shown in Fig. 1, the wings or extensions 31, 31 (see Fig. 9) will overlie the edges or ends of the plates 11, 12,—the faces 33 of such wings directly opposing the outer faces of said plates; but with the travel of the reciprocatory structure to its other extreme position (see Figs. 2 and 3), the gearing above described causes said wings to move through approximately 180°, so that their plane surfaces 34 come into abutting relation to the ends or edges of said plates, and thus their plane surfaces 33 become, in effect, extensions of and in the same plane as the outer surfaces of said plates 11 and 12.

The wings or extensions 31, 31 are hollow, each having a passage 39 extending longitudinally thereof, and from which there opens on the face or surface 33 a row of suction-openings 40, 40, in substantially parallel relation to the adjacent suction-openings 30, 30 of the plate 11 or the plate 12, as the case may be. The suction-openings 40, 40 have the same constant communication with the hollow rod 18 as do the suction-openings 30, 30; to this end, as shown in Figs. 1 and 2, each of the passages 29, 29 is connected to the interior of the adjacent bearing bracket 36 by a pipe or conduit 41; the bearing bracket interior, as shown in Fig. 3, presents a segmental recess 42 of approximately 180° extent, and with this recess registers in all positions of the associated wing or extension 31, a port or passage 43 which connects with the elongated passage 39 of said wing or extension. Thus the openings 40, 40 are subjected to suction whenever the openings 30, 30 are so subjected, and regardless of the positions of the movable wings 31, 31 which provide said openings 40, 40.

The operation of the apparatus as thus far described is as follows:—As the reciprocatory structure above described approaches the stack of blanks supported on the plates 2, 2, the wings or extensions 31, 31 turn outwardly, so that when contact is made with the lowermost blank of the stack, said wings are in the positions shown in Fig. 3. During this approach movement, the slot 20 of hollow rod 18 is moved far enough into the guide or support 19 to be shut off from communication with the atmosphere, and as a consequence becomes connected through port 21 with a pipe 44 which leads to any suitable means (not shown) for producing a continuous vacuum or suction. In this way, suction is made effective through the rows of openings 30, 30 and 40, 40 to grip and seize the lowermost blank of the stack as said reciprocatory structure enters between the plates 2, 2, and as said structure starts its return movement, said lowermost blank, by the maintenance of said suction, is stripped or pulled bodily away from the stack, the flaps *b*, *b* being wiped by this movement across the rollers 9, 9 which impose a minimum of retardation or resistance. In order to guard against more than one blank at a time being thus pulled out of the stack, the edges of the latter, as shown in Fig. 2, are preferably acted upon by one or more nozzle boxes 45, whose supports 46 are adjustably secured to the stack-supporting plates 2, 2; these nozzle boxes may have the teeth 47 which engage under the edge of the lowermost blank of the stack and help to support the latter. Compressed air, supplied to the boxes 45 by pipes 48, 48 from any suitable source, impinges on the edges of the stack and flows between the blanks or sheets thereof, tending thereby to prevent the sticking together of two or more of such blanks and thus promoting the one by one withdrawal of the blanks from the bottom of the stack by the aforesaid reciprocatory structure.

Figure 9:
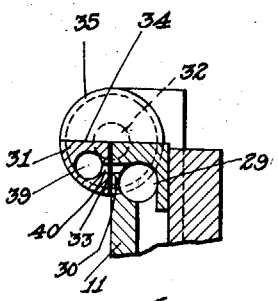
Fig. 9 is a fragmentary sectional view similar to Fig. 3, but showing a different position of the parts.
Figure 7:
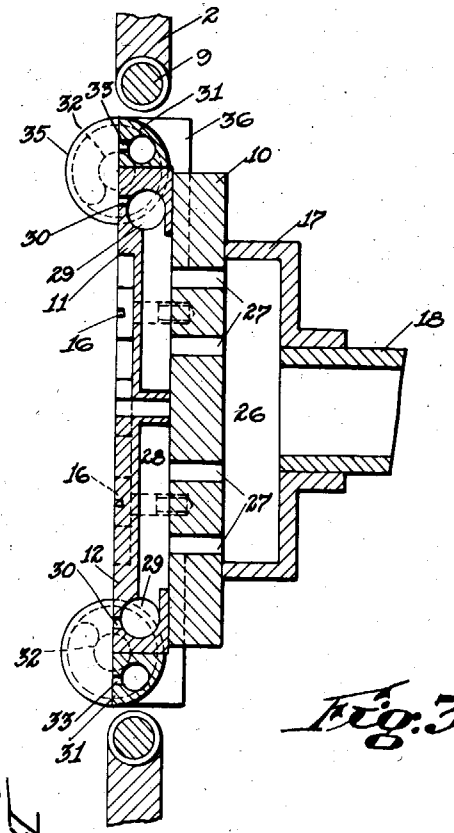

With the support of the lowermost blank thus transferred from the plates 2, 2 to such reciprocatory structure, and with the latter's rows of suction openings 30, 30 and 40, 40 firmly gripping the holding such blank on opposite sides of the proposed lines of fold of the two lateral flaps *b*, *b*, the return movement of said reciprocatory structure, from the position of Figs. 2 and 3 to the position of Fig. 1, effects the inward and downward folding and creasing of such flaps *b*, *b* in the following manner:—Through the gearing 37, 38, operating on both of the wings or extensions 31, 31, the latter are gradually swung or turned toward each other, about the axes of their shafts 32, until they have made rotations of approximately 180°, each wing or extension 31 at this time occupying the position shown in Fig. 9, approximately at the end or limit of the return stroke of said reciprocatory structure (see Fig. 1). At this point, the slot 20 has just cleared the guide or bearing 19, thereby opening the interior of shaft 18 to the atmosphere, and breaking suction hold of the rows of apertures 30, 30 and 40, 40 on the blank or sheet,—but before this occurs, the wings 31, 31, gripping the flaps *b*, *b*, have practically completed the accurate folding and creasing down of same on the fold lines *b'*, *b'* (Fig. 2), so that the release of the suction, a little ahead of the completion of the 180°, swings of said wings, in no way upsets the action of the wings in pressing said flaps *b*, *b* down flat against the central rectangular body portion of the blank, and the maintenance of the latter in registered position, notwithstanding the release of such suction. The other mechanism of my invention, for folding and sticking down on the inturned flaps *b*, *b* the flap *c*, Figs. 1 and 2, (which becomes the bottom flap of the envelope), and for creasing, gumming and drying the other flap *d*, (the sealing or closure flap of the envelope), will now be described in detail.

Operating in timed relation to the shaft 25 are the transverse cooperating rollers or cylinders 49 and 50, the latter being in the path of the projecting flap *c* of each successive blank seized and carried by said reciprocating structure, as above described,—but a suitable gap 51 in the peripheral surface of such roller 50 avoids interference with said flap *c* and permits the latter, at the end of the travel of the reciprocatory structure, to reach and be entered, in the position shown in Fig. 1, between said rollers 49 and 50. Simultaneously with the arrival of the blank in such position, the movement of the reciprocatory structure is reversed, in consequence of which the gearing 37 and 38 begins to swing the wings 31, 31 outwardly, thereby releasing the blank from the gripping pressure of said wings against the folded-down lateral flaps *b*, *b*; substantially at the instant of such release, a blade 52 on the cylinder 50 is brought by the rotation of such cylinder in opposition to the other cylinder 49, the latter having preferably a covering of soft rubber which yields to said blade 52, whose engagement with the blank in this fashion is timed to produce an initial score along the line of fold *c'* (Fig. 2) of said flap *c*. A subsequently-engaging blade 53 on cylinder 50 operates in the same fashion on the blank to produce an initial score corresponding to the line of fold *d'* (Fig. 2) of the sealing or closure flap *d*. The cooperating rollers or cylinders 49 and 50, which thus grip and move the blank as soon as it is released by the wings or extensions 31, 31, procure said blank's advancement, with the apex of flap *c* foremost, beneath a suitable guide 54 which directs the same over the rubber-covered cylinder 49 and beneath a rotating glue-applying device 55, the latter, as diagrammatically indicated in Fig. 1, having a pair of segmental ribs 56 (only one being shown) in divergent relation, whose edges receive glue from contact with a roller 57 that in turn contacts with a roller 58, partially immersed in a glue receptacle 59. The arrangement of the glue-receiving ribs 56 is such that they register substantially in their rotation with the pair of edge portions of the down-turned flaps *b*, *b* lying nearest to the flap *c* of the moving blank, in consequence of which moist gum or glue is applied to such edges, in readiness for the folding over of such flap *c* on line *c'*, to adhere with said edges and thereby to form the back wall of the envelope from the union of the three flaps *b*, *b* and *c*.

The partially folded and gummed blank continues its motion, flap *c* foremost, under the influence of suitable rollers 60, 61 to the position illustrated at *e*, Fig. 1, where the fold line *c'* is brought beneath and in registry with a descending fold-forming blade 62, the latter having a rocking motion on shaft 63 in timed relation to the rotation of shaft 25. The descending blade 62, engaging substantially with the score line *c'*, completes the folding along this line by causing the blank material to double upon itself, the doubled edge or fold being carried by the descent of said blade into the bight of the rollers 60 and 64. Said rollers 64, cooperating with roller 60 for this purpose, completes the pressing down of the flap *c* against the previously-gummed edges of the flaps *b*, *b*,—the adhesive union of such flaps procuring, as usual, the formation of the envelope's back wall. The folding blade 62 returns to the position shown in Fig. 1 before the next succeeding blank reaches the position *e*,—it being understood, of course, that successive blanks withdrawn from the stack 1 by the reciprocatory suction-folding structure above described, follow each other in appropriately spaced relation through the pairs of rolls 49, 50, 60, 61 and 60, 64 for the performance on each of the above-described scoring, gumming and folding functions.

Each of the thus-partially formed envelopes, advancing through the machine with its bottom fold *c'* foremost, comes next under the influence of the two pairs of rollers 65, 66 and 67, 68. A suitable concave guide 69 is interposed between the rollers 60, 64 and the rollers 65, 66, and a suitable convex guide 70 is interposed between the rollers 65, 66 and the rollers 67, 68; both of these guides 69 and 70 may be supported on a rod 71. The rollers 65 and 67 are driven at peripheral speeds considerably lower than the peripheral speeds of the rollers 60, 64. The rollers 66 and 68 are preferably undriven, but are rotatably mounted so as to derive frictional rotation from contact either with their companion rollers 65 and 67, respectively, or from the passing material.

In passing from the fast running rollers 60, 64 to the slower running rollers 65, 66, each envelope has its trailing extension or flap portion *d* tipped slightly upward, due to the fact that the edge of guide 69 adjacent said slower rollers 65, 66 is slightly higher than the highest point of roller 65. Since the forward progress of each envelope is very materially slowed down in the rollers 65, 66, it is inevitable that the advancing edge *c'* of the next-following and faster-moving envelope will be pushed into the rolls 65, 66 below such upwardly tipped rear flap of the preceding envelope,—the result of this being the emergence of a succession of envelopes in shingled relation on the guide 70, substantially as shown in Figs. 1 and 4,—the preceding envelopes overlying those following or succeeding to such an extent that only the rear edges of the successive extended flaps *d*, *d* are exposed.

Figure 4:
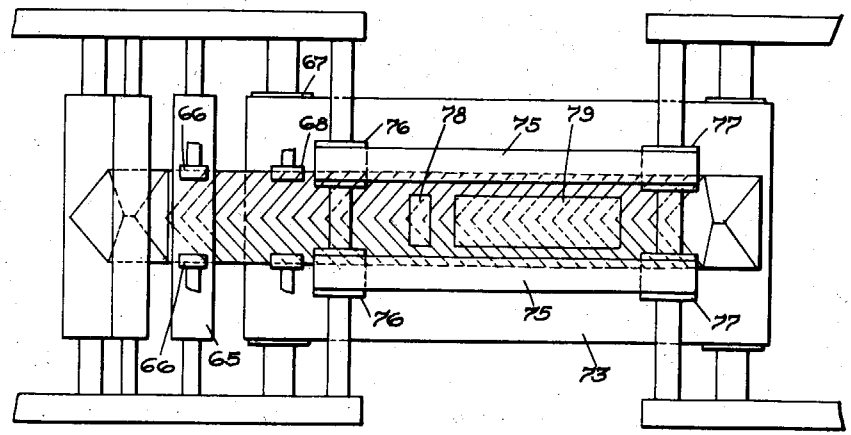
Fig. 4 is a plan view of the machine elements appearing intermediate the length of Fig. 1.

The shingling of the envelopes as above described is maintained by the relatively slow rolls 67, 68, the former, as shown in Figs. 1 and 4, cooperating with another roller 72 considerably spaced therefrom, for the support and movement of an endless conveyor belt 73. The upper course of belt 73 passes over a convex support 74, and cooperating with said upper course are the lower courses of a pair of conveyor straps or belts 75, 75 that run on suitable rollers 76, 76 and 77, 77. These rollers 76, 76 and 77, 77 are so adjusted on their shafts that the upper straps or belts 75, 75 engage the shingled envelopes *f*, *f* only along their opposite folded ends or edges, as shown in Fig. 4. The belts 73 and 75, 75 cooperate to continue the slow advance of the overlapped envelopes, and to maintain their shingled arrangement which, as shown in Fig. 4, results in exposing only the edge portions of the flap *d* of each successive article. Such slow movement en masse, in shingled relation, is utilized for the application of sealing gum to such exposed edge portions and for the drying of such gum,—and to this end, a suitable box or trough 78, supplied with liquid adhesive from any source, not shown, is arranged to discharge and spread such adhesive continuously over the exposed edge portions of the flaps *d*, *d* successively arriving beneath said box or trough. Thereafter, the surfaces so coated in their progressive slow advance by the belts 73 and 75, 75 are subjected to the drying action of a suitable elongated heating device 79,—the duration of such heating being sufficiently prolonged so that the adhesive coating applied by box 78 will have dried by the time the article reaches the roller 80 at the end of the upper course of belt 73.

Such roller 80 is journalled directly above the roller 72 and serves, in conjunction with the belt 73, as the means for procuring the slow feed of the successive envelopes *f*, *f* to the bight of a pair of rollers 81, 82 which are driven at a relatively high speed, corresponding substantially to that of the rollers 60, 64. In this way, the separation or unshingling of the article *f*, *f* is obtained,—and these two rollers 81, 82 assist also in procuring the folding down of the adhesive-coated flap *d* of each envelope, in the following manner:—

The roller 82 provides a recess 83 within which is received the forward edge *c'* of each envelope. Said roller 82, as shown in Fig. 6, also provides elsewhere on its periphery the suction-openings 84, 84 which communicate with an interior chamber 85 of said roller. Said chamber 85 provides a suitable port 86, adapted to register, during a certain part of the roller's rotation, with a segmental opening 87 from an interior chamber 88 of a hollow member 89, whose interior has a connection 90 to any suitable source of vacuum, not shown. The other roller 81 has a recess or groove 91 in its periphery, for the reception of one or more radially disposed pins or plungers 92 which, by means of springs 93, are normally pressed outward beyond the peripheral surface of the roller, said springs yielding to let the pins or plungers retract to a position flush with the roller surface, when the pins, in the rotation of said roller, come opposite the roller 82, or opposite a third roller 94, which is at substantially the same level as the roller 81. Immediately adjacent the suction roller 82 is disposed a substantially upright guide 95 approximately the same height as the folded envelope, said guide at its upper end providing a leg 96.

The advancing edge *c'* of each envelope projected between the rollers 81 and 82 is received in a recess 83, and in consequence of this, the bight of rollers 81, 82 of such envelope is not exerted until the trailing edge of recess 83 arrives at the point of tangency between rollers 81 and 82. At such time, the normal tendency of the rollers 81 and 82 to impart a rectilinear advancing movement to the envelope pinched between them is counteracted by the suction exerted through openings 84, 84 which grips the envelope at an appropriate distance from the edge *c'* and causes it to curl or curve upwardly, travelling in unison with the surface of roller 82. This upward movement of the envelope projects its free or ungripped edge *c'* into the notch or space between leg 96 and guide 95, and substantially coincidentally with this action, the trailing end or flap portion *d* of the envelope (already creased or scored as above set forth) emerges from the rollers 81, 82, and the envelope itself is released from the suction grip of the openings 84, 84 by the movement of port 86 out of registry with the opening 87. At about this time, the pins 92, 92, having passed the point of tangency with roller 82, spring outwardly from the roller 81 against the released flap portion *d* and thereby accentuate the bend or score between the latter and the body of the envelope, which latter, being at this time relieved of any vertical support from the roller 82, drops down edgewise in guide 95 to enter the score line of flap *d* between the rollers 81 and 94,—this completing the folding down of flap *d* and projecting the completed envelope downward, onto any suitable support or receiver, not shown.

A modification of the final folding and delivery mechanism of the machine is shown in Fig. 5, where a roller 82 and guide 95, the same as in Fig. 1, are provided, but where the cooperative roller 97 omits the spring-pressed pins. The third roller 98 in this arrangement is provided with suction apertures 99, these seizing the released envelope as it drops edgewise from guide 95 and procuring its passage between the rollers 97 and 98 to crease down the seal flap *d*. The seized envelope is carried around by the suction roller 98, and has its advancing edge projected under a guide member 100 which forms part of a stacking mechanism, not shown. This guide 100 strips the completed upwardly moving envelope progressively from the suction roller 98, leaving the envelope in a substantially vertical position, confined between said guide and the previously-received envelopes of the stack.

I claim:

1. A machine for folding flat paper articles, comprising a pair of spaced sheet-supporting members for supporting a pile of sheets at a pair of opposed corners, and sheet-folding means for operation on certain flaps or extensions of said sheets, in combination with a plate having suction means for suctionally engaging a lowermost sheet of the pile, said plate being arranged for movement from a point below the pile of sheets to a position for delivering the lowermost sheet to said sheet-folding means, sheet-folding members pivoted to a pair of opposed edges of the plate and movable from a position in which they form a continuation of the plate at said edges into a position in which they bear against the plate and vice versa, said sheet-folding members having suction means for suctionally engaging the said sheet, means operatively connected to the sheet-folding members for turning said members towards the plate during the movement of the plate away from the pile so as to fold the sheet along lines registering with said opposed edges of the plate, means for moving the plate towards and away from the pile of sheets, and controlling means for breaking the suction action on the plate reaching the delivery position.

2. A machine for folding flat paper articles, comprising sheet-supporting means for supporting a pile of sheets, a pair of creasing rollers for forming creases on lines defining certain of the flaps of said sheets, sheet-feeding means arranged for movement from a point below the pile of sheets to a position for delivering the lowermost sheet to said creasing rollers, said sheet-feeding means having sheet-folding means thereon for folding the sheet on lines to form two other flaps, one of said creasing rollers having a gap therein to receive a corner of the sheet during the movement of the sheet-feeding means from the pile to the creasing rollers, and folding means to receive the sheets from the creasing rollers to complete the folding along the creases.

3. A machine as set forth in claim 2, in which one of the creasing rollers has a pair of circumferentially spaced creasing blades thereon, and the other creasing roller has a yielding surface to allow the creasing blades to enter it.

4. A machine for folding flat paper articles, comprising sheet-supporting means for supporting a pile of sheets, sheet-feeding means for removing the lowermost sheet from the pile and having means thereon for folding the sheet on lines defining a certain pair of flaps of said sheet, adhesive applying means for applying adhesive to the edges of said pair of folded flaps, sheet-folding means for folding each sheet on a line defining a third flap thereof and for applying said third folded flap to said pair of folded flaps to stick said folded parts together, a pair of conveying rollers for receiving the folded article from the last-mentioned folding means, a second pair of conveying rollers movable at a peripheral velocity lower than that of the first-mentioned conveying rollers, a guide interposed between the pairs of conveying rollers for tilting the unfolded parts of the sheets so as to enable the articles to pass to the second pair of rollers in overlapping relationship, means for applying adhesive to the unfolded parts of the sheets, drying means for the adhesive, a conveyor for feeding the articles in overlapping relationship past the adhesive-applying means and drying means, and means for folding each sheet on a line defining a fourth flap, and arranged to receive the articles from the said conveyor.

5. In a machine for folding flat paper articles, the combination with means for folding sheets on lines to form three flaps, means for creasing each sheet on a line to form a fourth flap, means for applying adhesive to the folded parts and means for applying the folded parts to one another under pressure to stick the folded parts together, of means for folding the sheet across the line to form the fourth flap, comprising a pair of rollers arranged to receive the sheet with the creased part to the rear, one of said rollers having suction passages therein for enabling the roller to engage the sheet by suction, and the second roller having a pair of axially spaced pins retractably mounted therein and springs arranged to push said pins forwardly so as to pass behind the creased part of the sheet and move it forwardly to initiate the folding of said part, a third roller cooperating with said second roller, and a guide arranged to receive the sheet from the roller having the suction passages therein and cooperating with said pins to guide the folded sheet between said second and third rollers for enabling the latter to complete the folding of the creased part.

6. In a machine for folding flat paper articles, the combination with means for folding sheets on lines to form three flaps, means for creasing each sheet on a line to form a fourth flap, means for applying adhesive to the folded parts and means for applying the folded parts to one another under pressure to stick the folded parts together, of means for folding the sheet across the line to form the fourth flap, comprising a pair of rollers arranged to receive the sheet with the creased part to the rear, one of said rollers having suction passages therein for enabling the roller to engage the sheet by suction, a third roller cooperating with the other roller of said pair, and a guide arranged to receive the folded sheet from the roller having the suction passages therein, to guide the folded sheet between said other roller of the pair and said third roller, said third roller having suction passages therein for enabling it to engage the folded sheet suctionally and pass it between itself and the other roller of said pair, to complete the folding of the creased part.

7. A folding apparatus for envelope machines and the like, comprising a plate or support adapted to underlie the central portion of the sheet or blank to be folded, and having suction apertures near its edges extending substantially along the proposed lines of fold of said sheet or blank, and a plurality of folding members, each hinged to said plate at an edge thereof, and each adapted to underlie an extension or flap of said sheet or blank, each folding member, adjacent its hinge, having a suction aperture extending substantially along the proposed line of fold, means for exerting suction on the sheet or blank through the several suction apertures aforesaid, and means operative, while the sheet or blank is so held by suction, for swinging said folding members on their hinges into overlying relation to said plate or support, thereby to produce the desired lines of fold in said sheet or blank.

8. In an envelope machine, means for supporting a stack of blanks, a reciprocatory member adapted to move into substantial engagement with successive lowermost blanks of said stack, and providing suction openings by which to seize each such blank and withdraw it from the stack, as said member reverses its movement, the suction openings being adjacent to and on opposite sides of the proposed line of fold of a flap of said blank, and those on one side of said line being provided by a pivoted extension of said reciprocatory member, said extension underlying said flap, and means responsive to the reverse movement of said member for rocking said extension on its pivot, to turn and fold said suction-held flap on said line of fold against the other suction-held portion of said blank.

MAX GODER.